United States Patent
Suzuki

(10) Patent No.: US 7,652,705 B2
(45) Date of Patent: Jan. 26, 2010

(54) PHOTOELECTRIC CONVERSION FILM-STACKED TYPE SOLID-STATE IMAGING DEVICE

(75) Inventor: Nobuo Suzuki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 833 days.

(21) Appl. No.: 11/081,915

(22) Filed: Mar. 17, 2005

(65) Prior Publication Data

US 2005/0206766 A1 Sep. 22, 2005

(30) Foreign Application Priority Data

Mar. 18, 2004 (JP) ............... P.2004-077694

(51) Int. Cl.
- *H04N 3/14* (2006.01)
- *H04N 5/335* (2006.01)
- *H04N 9/083* (2006.01)
- *H04N 9/04* (2006.01)
- *H01L 31/062* (2006.01)
- *H01L 31/113* (2006.01)

(52) U.S. Cl. ............... 348/308; 348/280; 348/294; 257/292

(58) Field of Classification Search ......... 348/300–310, 348/311–324; 257/226, 291–292
See application file for complete search history.

(56) References Cited

U.S. PATENT DOCUMENTS

| | | | | |
|---|---|---|---|---|
| 4,438,455 A | * | 3/1984 | Tabei | ............... 348/280 |
| 6,239,453 B1 | | 5/2001 | Yamada et al. | |
| 6,300,612 B1 | | 10/2001 | Yu | |
| 6,730,934 B2 | | 5/2004 | Yamada et al. | |
| 7,411,233 B2 | * | 8/2008 | Chao et al. | ............... 257/292 |
| 7,446,806 B2 | * | 11/2008 | Carlson et al. | ............... 348/308 |
| 2002/0003201 A1 | | 1/2002 | Yu | |
| 2002/0101895 A1 | | 8/2002 | Augusto | |
| 2004/0056180 A1 | | 3/2004 | Yu | |

FOREIGN PATENT DOCUMENTS

| | | | |
|---|---|---|---|
| JP | 58-103165 A | | 6/1983 |
| JP | 2002-502120 A | | 1/2002 |
| JP | 2002-83946 A | | 3/2002 |
| JP | 2003-502847 A | | 1/2003 |
| JP | 3405099 B2 | | 3/2003 |

* cited by examiner

*Primary Examiner*—Jason Chan
*Assistant Examiner*—Pritham Prabhakher
(74) *Attorney, Agent, or Firm*—Birch, Stewart, Kolasch & Birch, LLP.

(57) ABSTRACT

To achieve high sensitivity in such a manner that photoelectric charges generated by photoelectric conversion films are made to flow into gates of output transistors smoothly to increase a signal voltage relative to signal charges, a solid-state imaging device includes: a semiconductor substrate having signal readout circuits constituted by MOS transistor circuits; photoelectric conversion films stacked on the semiconductor substrate for generating signal charges in accordance with the incident light intensity; connection portions provided on the surface of the semiconductor substrate and connected to wirings leading the signal charges to the surface of the semiconductor substrate; charge paths provided so that the connection portions can be connected to gate portions of output transistors (sources of reset transistors) constituting the signal readout circuits; and potential barrier units provided near the connection portions so as to serve as constant potential barriers relative to charges of the connection portions.

9 Claims, 6 Drawing Sheets

PHOTOELECTRIC CONVERSION FILM-STACKED TYPE SOLID-STATE IMAGING DEVICE

FIELD OF THE INVENTION

The present invention relates to a photoelectric conversion film-stacked type solid-state imaging device in which photoelectric conversion films for generating charges in accordance with the intensity of received light are stacked on a semiconductor substrate, and particularly relates to a photoelectric conversion film-stacked type solid-state imaging device in which signals in accordance with the amounts of signal charges generated by photoelectric conversion films are read out to the outside by MOS type transistor circuits formed on a semiconductor substrate.

BACKGROUND OF THE INVENTION

In a CCD type solid-state imaging device or a CMOS type solid-state imaging device mounted in a digital camera, a large number of photoelectric conversion devices (photodiodes) serving as photo acceptance portions and signal readout circuits for reading out photoelectric conversion signals obtained by the photoelectric conversion devices to the outside are formed on a surface of a semiconductor substrate. In the CCD type solid-state imaging device, each of the signal readout circuits includes a charge transfer circuit, and a transfer electrode. In the CMOS type solid-state imaging device, each of the signal readout circuits includes an MOS circuit, and a signal wiring.

Accordingly, in the solid-state imaging device according to the related art, both the large number of photo acceptance portions and the signal readout circuits have to be formed together on the surface of the semiconductor substrate. There is a problem that the total area of the photo acceptance portions cannot be enlarged.

In addition, in a single plate type solid-state imaging device according to the related art, one of color filters, for example, of red (R), green (G) and blue (B) is stacked on each photo acceptance portion so that each photo acceptance portion can detect an optical signal with corresponding one of the colors. For this reason, for example, a blue optical signal and a green optical signal in a position of a photo acceptance portion for detecting red light are obtained by applying an interpolation operation on detection signals of surrounding photo acceptance portions for detecting blue light and green light. This causes false colors to thereby result in lowering of resolution. In addition, blue and green light beams incident on a photo acceptance portion covered with a red color filter are absorbed as heat to the color filter without giving any contribution to photoelectric conversion. For this reason, there is also another problem that light utilization efficiency deteriorates and sensitivity is lowered.

While the solid-state imaging device according to the related art has various problems as described above, development on increase in the number of pixels has advanced. At present, a large number of photo acceptance portions (e.g. equivalent to several million pixels) are integrated on one chip of a semiconductor substrate, so that the size of an aperture of each photo acceptance portion approaches the wavelength of light. Accordingly, it is difficult to expect a CCD type or CMOS type image sensor to have better image quality or sensitivity than ever to thereby solve the abovementioned problems.

Under such circumstances, the structure of a solid-state imaging device, for example, described in JP-A-58-103165 has been reviewed. The solid-state imaging device has a structure in which a photosensitive layer for detecting red light, a photosensitive layer for detecting green light and a photosensitive layer for detecting blue light are stacked on a semiconductor substrate having signal readout circuits formed in its surface, by a film-forming technique and in which these photosensitive layers are provided as photo acceptance portions so that photoelectric conversion signals obtained by the photosensitive layers can be taken out to the outside by the signal readout circuits. That is, the solid-state imaging device has a photoelectric conversion film-stacked type structure.

According to the structure, limitation on design of the signal readout circuits can be reduced greatly because it is unnecessary to provide any photo acceptance portion on the surface of the semiconductor substrate. Moreover, sensitivity can be improved because efficiency in utilization of incident light is improved. In addition, resolution can be improved because light with the three primary colors of red, green and blue can be detected from one pixel. The problem of false colors can be eliminated. The problems inherent to the CCD type or CMOS type solid-state imaging device according to the related art can be solved.

Therefore, photoelectric conversion film-stacked type solid-state imaging devices described in JP-A-2002-83946, JP-T-2002-502120, JP-T-2003-502847 and JP-B-3405099 have been proposed in recent years. An organic semiconductor or nano particles may be used as the material of each photosensitive layer.

In the solid-state imaging device in which the photoelectric conversion films are stacked on the semiconductor substrate and in which signals are read out by the transistor circuits formed on the semiconductor substrate, capacitance between each transistor circuit and a corresponding photoelectric conversion film provided as a layer above the transistor circuit becomes high because the area of pixels is widened and the length of wiring for connecting the transistor circuit to the photoelectric conversion circuit is elongated. For this reason, there is a problem that a signal voltage component becomes low because photoelectric charges generated by the photoelectric conversion films are retained in the middle without flowing smoothly to gates of the output transistors.

SUMMARY OF THE INVENTION

An object of the invention is to provide a photoelectric conversion film-stacked type solid-state imaging device having a structure in which photoelectric charges generated by photoelectric conversion films can be made to flow smoothly into gates of output transistors.

According to the invention, there is provided a solid-state imaging device that is a photoelectric conversion film-stacked type, which includes: a semiconductor substrate having a signal readout circuit, wherein the signal readout circuit is an MOS transistor circuit, and the signal readout circuit comprises an output transistor; a photoelectric conversion film that generates a signal charge in accordance with an intensity of an incident light; a wiring that leads the signal charge to the semiconductor substrate; a connection portion that connects the wiring to the semiconductor substrate; a charge path that connects the connection portion to a gate portion of the output transistor; and a potential barrier unit near the connection portion, wherein the potential barrier unit serves as a potential barrier against a charge of the connection portion.

According to this configuration, the signal charge generated by the photoelectric conversion film rapidly flow into the gate portion of the output transistor without being retained in places prior to the connection portion, so that a signal voltage becomes high relative to the signal charges, thereby achieving high sensitivity.

In the solid-state imaging device according to the invention, the signal readout circuit include the output transistor, a row selection transistor, and a reset transistor.

According to this configuration, the configuration of the signal readout circuit used in a CMOS type image sensor according to the related art can be used directly.

In the solid-state imaging device according to the invention, the potential barrier unit is provided in the charge path and formed in such a manner that impurities of an electric conductivity type opposite to that of the charge path, the connection portion and the gate portion are injected into the charge path to form an impurity portion.

According to this configuration, the level (height) of the potential barrier can be adjusted by the thickness of the impurity portion and the density of the impurities of the electric conductivity type.

In the solid-state imaging device according to the invention, the potential barrier unit is constituted by a gate electrode on a gate insulator and between a source and a drain, wherein the connection portion is provided as the source while the gate portion is provided as the drain.

According to this configuration, the potential barrier unit can be constituted by a general MOS transistor structure, so that there is an advantage that manufacturing becomes easy and the number of steps of the manufacturing can be reduced.

In the solid-state imaging device according to the invention, a plurality of photo acceptance portions are arranged in a planar array on a surface portion of the solid-state imaging device. The solid-state imaging device includes a plurality of sets of layered products, wherein the sets of the layered products are stacked in a direction perpendicular to a surface of the semiconductor substrate, each of the layered products including: a common electrode film to pixels; a plurality of pixel electrode films arranged in the planar array, each of the pixel electrode films being partitioned in accordance with one of the pixels; and the photoelectric conversion film between the common electrode film and the pixel electrode films arranged in the planar array. The photoelectric conversion film of each of the layered products detects the incident light differing in wavelength between the layered products. The pixel electrode films in each position of the planar array are arranged in a line with respect to an incidence direction of the incident light, and the pixel electrode films in each position of the planar array form one partition unit of the photo acceptance portions.

According to this configuration, it is possible to detect a plurality of colors simultaneously in one photo acceptance portion, so that it is possible to improve resolution and light utilization efficiency, suppress false colors and increase sensitivity. Thus, the problems inherent to the CCD type or CMOS type image sensor according to the related art can be solved.

In the solid-state imaging device according to the invention, photoelectric conversion films in the sets of the layered products include a first photoelectric conversion film having a peak of spectral sensitivity characteristic at red, a second photoelectric conversion film having a peak of spectral sensitivity characteristic at green, and a third photoelectric conversion film having a peak of spectral sensitivity characteristic at blue.

According to this configuration, it is possible to capture a color image based on the three primary colors and it is possible to use an existing signal processing circuit for R, G and B signals.

In the solid-state imaging device according to the invention, the semiconductor substrate has the signal readout circuit for reading out signals of the colors of red, green and blue detected by the photo acceptance portions, and the signal readout circuit is formed under the photo acceptance portion.

In the invention, limitation on design of the signal readout circuit can be reduced greatly because it is unnecessary to provide any photo acceptance portion on the surface of the semiconductor substrate. Accordingly, it is easy to cope with increase in the number of transistors constituting each signal readout circuit even if the number of transistors increased.

In the solid-state imaging device according to the invention, an image signal output portion for accepting an analog signal read out by the signal readout circuit from the photo acceptance portions and outputting the analog signal to the outside is formed in the semiconductor substrate. In addition, the image signal output portion includes an analog-to-digital conversion portion for converting the analog signal into a digital signal and outputting the digital signal.

The invention can be applied to a solid-state imaging device for outputting an image signal as the analog signal or to a solid-state imaging device for outputting the image signal as the digital signal.

According to the invention, the solid-state imaging device has the structure in which photoelectric charges generated by the photoelectric conversion films can be made to flow into the gate portion of the output transistor, so that a signal voltage becomes high relative to the signal charge, thereby achieving high sensitivity.

DETAILED DESCRIPTION OF THE INVENTION

An embodiment of the invention will be described below with reference to the drawings.

FIRST EMBODIMENT

Figure 1:
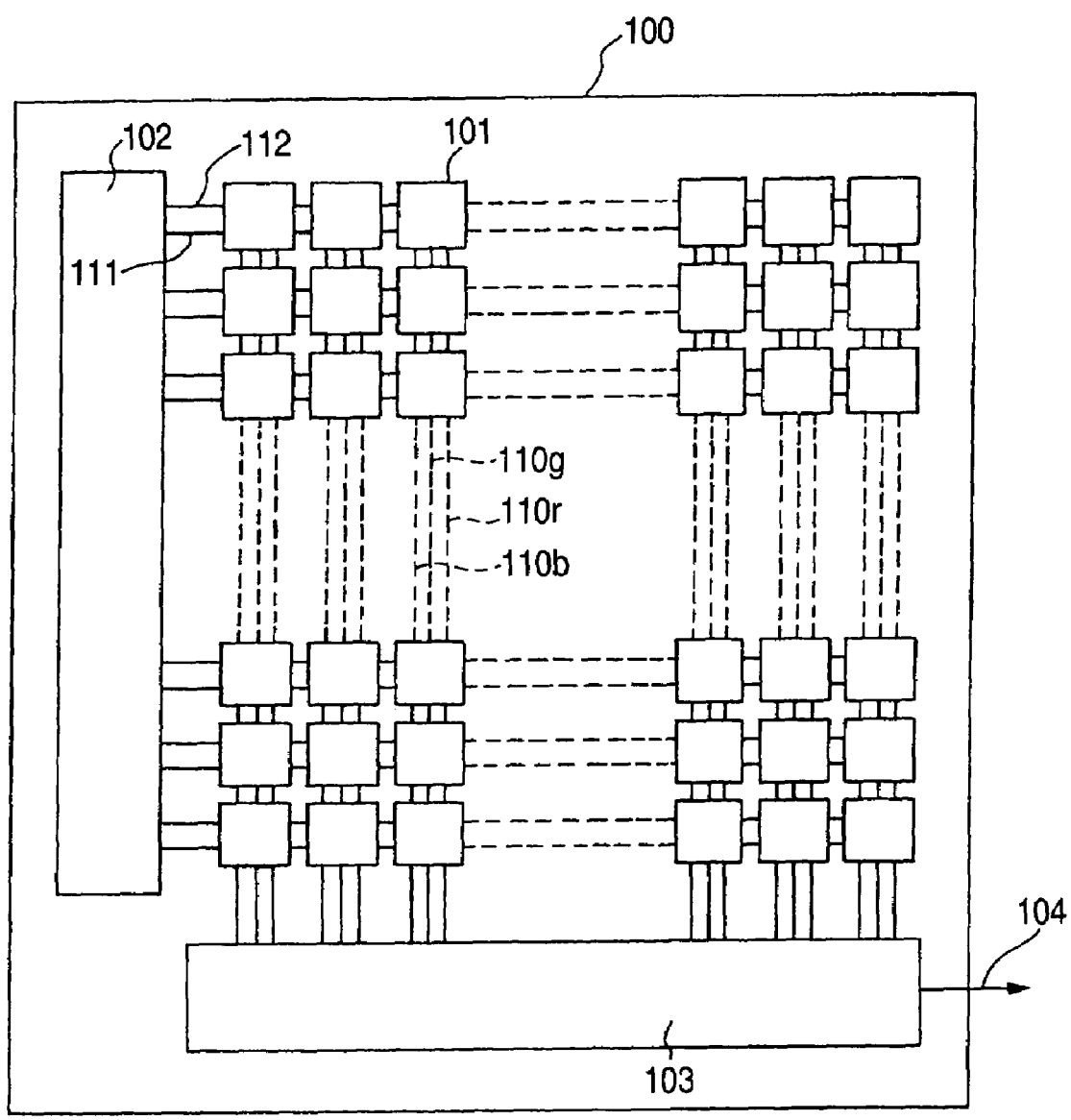
FIG. 1 is a typical view showing a surface of a solid-state imaging device according to a first embodiment of the invention.

FIG. 1 is a typical view showing a surface of a solid-state imaging device according to a first embodiment of the invention. The solid-state imaging device 100 includes a large number of photo acceptance portions 101 (each corresponding to a pixel). In this embodiment, the photo acceptance portions 101 are arranged in the form of a tetragonal lattice. Signal readout circuits constituted by an MOS transistor circuit, which will be described later, are formed on a surface portion of a semiconductor substrate under each of the photo acceptance portions 101 of the solid-state imaging device 100.

A rows election signal through a row selection signal line 111 and a reset signal through a reset signal line 112 are given from a row selection scanning circuit 102 to each of the signal readout circuits provided in accordance with the photo acceptance portions. Column signals (image signals) through column signal lines 110r, 110g and 110b are output from the signal readout circuits to an image signal output portion 103. An output signal 104 is output from the image signal output portion 103. The image signal output portion 103 may output the taken-in image signals as analog signals, or may have an analog-to-digital conversion that converts the image signals into digital signals and may output the digital signals.

Figure 2:
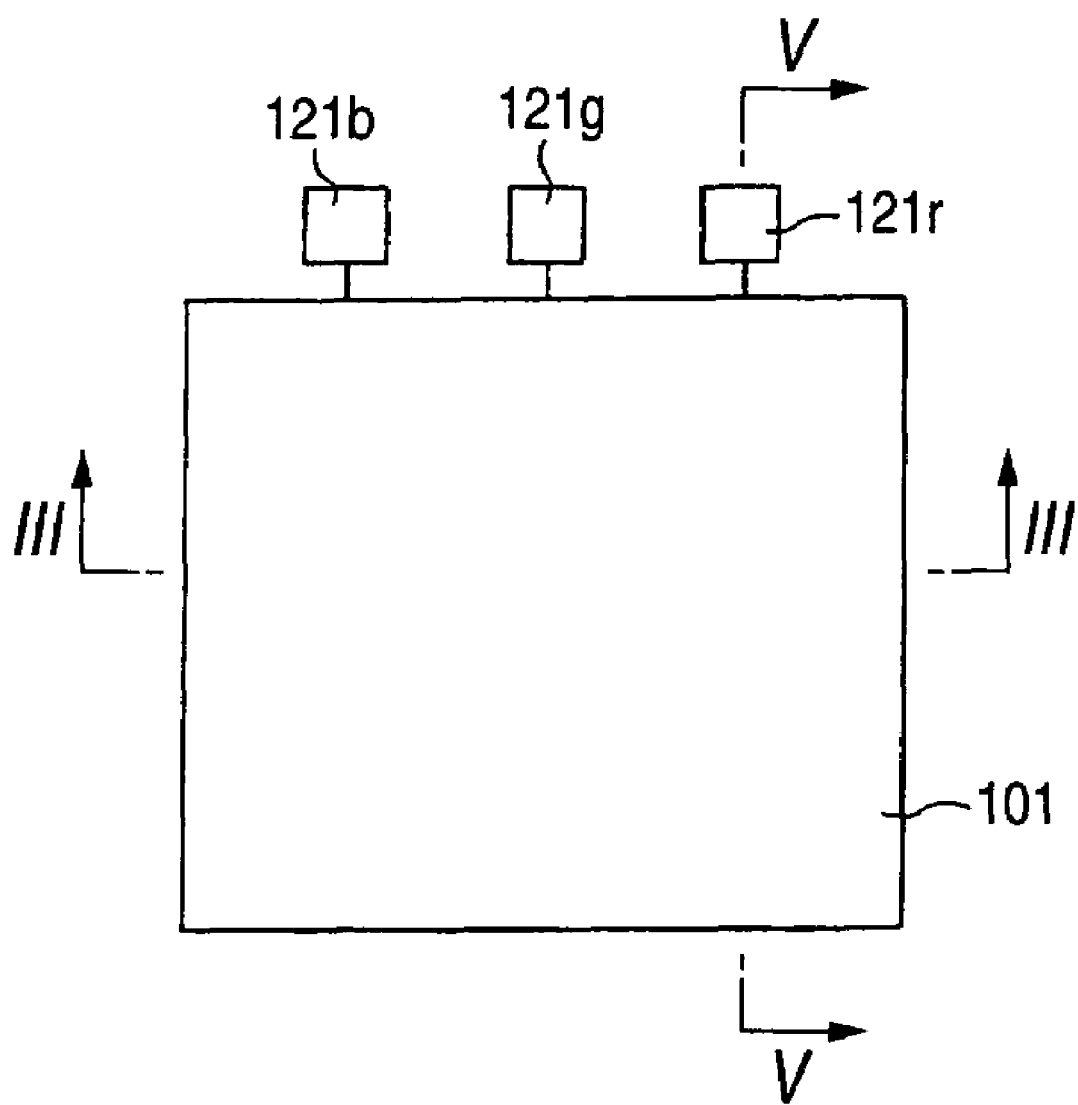
FIG. 2 is an enlarged typical view showing each photo acceptance portion depicted in FIG. 1.

FIG. 2 is an enlarged typical view showing each photo acceptance portion 101 depicted in FIG. 1. In this embodiment, three connection portions 121r, 121g and 121b with respect to each photo acceptance portion 101 are provided in one photo acceptance portion 101. Incidentally, a suffix r, g or b corresponds to red (R), green (G) or blue (B) which is the color of incident light to be detected. The same rule applies to the following description.

Figure 3:
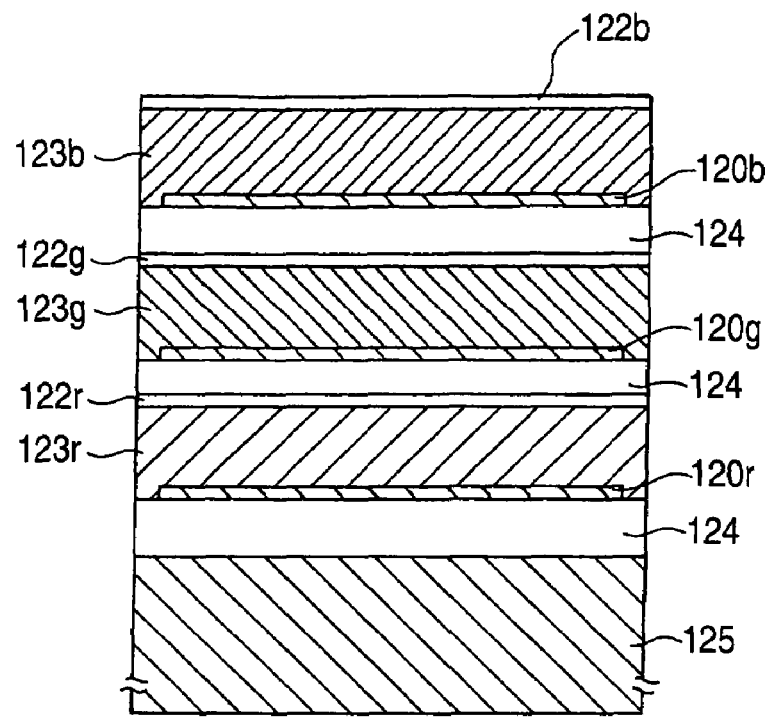
FIG. 3 is a typical sectional view taken along the line III-III in FIG. 2.

FIG. 3 is a typical sectional view taken along the line III-III in FIG. 2. A transparent insulator film 124 is first stacked on a semiconductor substrate 125. An electrode film (hereinafter referred to as pixel electrode film) 120r partitioned in accordance with each of the photo acceptance portions 101 is then stacked on the transparent insulator film 124. A photoelectric conversion film 123r for detecting red (R) is then stacked on the pixel electrode film 120r. The photoelectric conversion film 123r need not be partitioned in accordance with each of the photo acceptance portions 101. That is, the photoelectric conversion film 123r is stacked as a single sheet on the whole of a photo acceptance surface formed by a set of all the photo acceptance portions 101. Pixel electrode films constituted by all the pixel electrode film 120r are arranged in the form of the tetragonal lattice on the whole of the photo acceptance surface.

A common electrode film 122r which is common to the respective photo acceptance portions 101 for detecting red signals is stacked likewise as a single sheet on the photoelectric conversion film 123r to form a layered product for red. A transparent insulator film 124 is then stacked on the common electrode film 122r.

A pixel electrode film 120g partitioned in accordance with each of the photo acceptance portions 101 is stacked on the insulator film 124. A photoelectric conversion film 123g for detecting green (G) is stacked as a single sheet on the pixel electrode film 120g in the same manner as described above. A common electrode film 122g is then stacked on the photoelectric conversion film 123g to form a layered product for green. A transparent insulator film 124 is then stacked on the common electrode film 122g.

A pixel electrode film 120b partitioned in accordance with each of the photo acceptance portions 101 is stacked on the insulator film 124. A photoelectric conversion film 123b for detecting blue (B) is stacked as a single sheet on the pixel electrode film 120b in the same manner as described above. A common electrode film 122b is then stacked on the photoelectric conversion film 123b to form a layered product for blue.

The pixel electrode films 120b, 120g and 120r in accordance with one of the photo acceptance portions 101 are arranged in a line with respect to an incident direction of an incident light (i.e., approximately in a direction perpendicular to a surface of the semiconductor substrate). The solid-state imaging device 100 according to the embodiment is configured so that the three colors of red (R), green (G) and blue (B) are detected by each photo acceptance portion 101. The simply described term "pixel" hereinafter means a photo acceptance portion 101 for detecting the three colors whereas the described term "color pixel", "red pixel", "green pixel" or "blue pixel" means a partial pixel (i.e. the portion of a photoelectric conversion film sandwiched between a common electrode film and a pixel electrode film) for detecting corresponding one of the colors.

The connection portion 121b shown in FIG. 2 is connected to a blue pixel electrode film 120b. The connection portion 121g shown in FIG. 2 is connected to a green pixel electrode film 120g. The connection portion 121r shown in FIG. 2 is connected to a red pixel electrode film 120r.

A tin oxide ($SnO_2$) thin film, a titanium oxide ($TiO_2$) thin film, an indium oxide ($InO_2$) thin film or an indium titanium oxide (ITO) thin film may be used as each of the homogeneous transparent electrode films 122r, 122g, 122b, 120r, 120g and 120b. The homogeneous transparent electrode film is not limited thereto.

A single layer film or a multilayer film may be used as each of the photoelectric conversion films 123r, 123g and 123b. Various materials can be used as the materials of the photoelectric conversion films 123r, 123g and 123b. Examples of the materials include: inorganic materials such as silicon or compound semiconductor; organic materials containing organic semiconductor, organic pigment, etc.; and quantum dot-deposited films made from nano particles.

Figure 4:
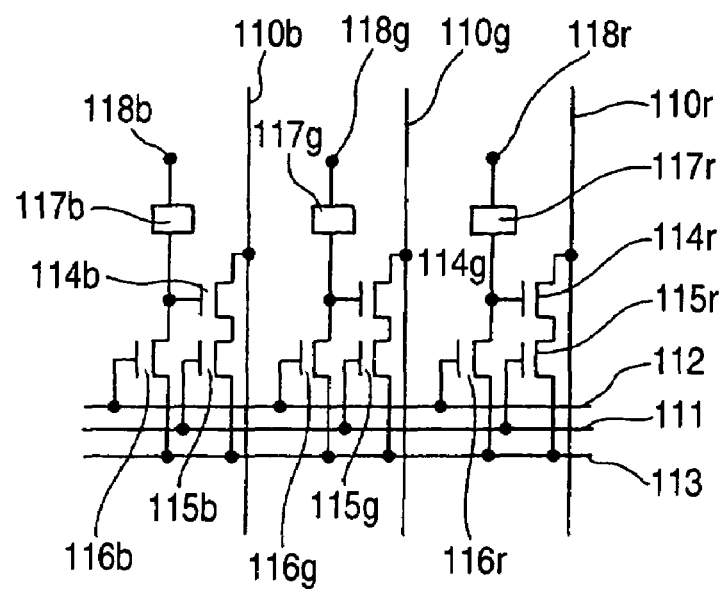
FIG. 4 is a circuitry diagram of each signal readout circuit formed on the surface of a semiconductor substrate depicted in FIG. 3.

FIG. 4 is a circuitry diagram of each signal readout circuit formed in the semiconductor substrate 125. The signal readout circuit has the same basic configuration as that of a transistor circuit for use in a CMOS type solid-state imaging device according to the related art. The signal readout circuit is configured so that three MOS transistors are used for each color pixel. That is, nine MOS transistors 114r, 114g, 114b, 115r, 115g, 115b, 116r, 116g and 116b in total are used for each pixel because the signal readout circuit is configured so that three colors of R, G, and B each pixel are detected.

In accordance with the colors of R, G and B, sources of output transistors 114r, 114g and 114b are connected to column signal lines 110r, 110g and 110b, drains of the output transistors 114r, 114g and 114b are connected to sources of row selection transistors 115r, 115g and 115b, and gates of the output transistors 114r, 114g and 114b are connected to sources of reset transistors 116r, 116g and 116b. Gates of the row selection transistors 115r, 115g and 115b are connected to a row selection line 111 while drains of the row selection transistors 115r, 115g and 115b are connected to a DC power supply line 113. Gates of the reset transistors 116r, 116g and 116b are connected to a reset signal line 112 while drains of the reset transistors 116r, 116g and 116b are connected to the DC power supply line 113.

This embodiment has a feature that potential barrier units 117r, 117g and 117b are provided between junctions of the gates of the output transistors 114r, 114g and 114b and the sources of the reset transistors 116r, 116g and 116g and connection portions 118r, 118g and 118b provided on the semiconductor substrate, respectively. The connection portions 118r, 118g and 118b are connected to the connection portions 121r, 121g and 121b shown in FIG. 2 by columnar wiring electrodes (i.e., wirings) 144r, 144g and 144b which will be described later.

Figure 5:
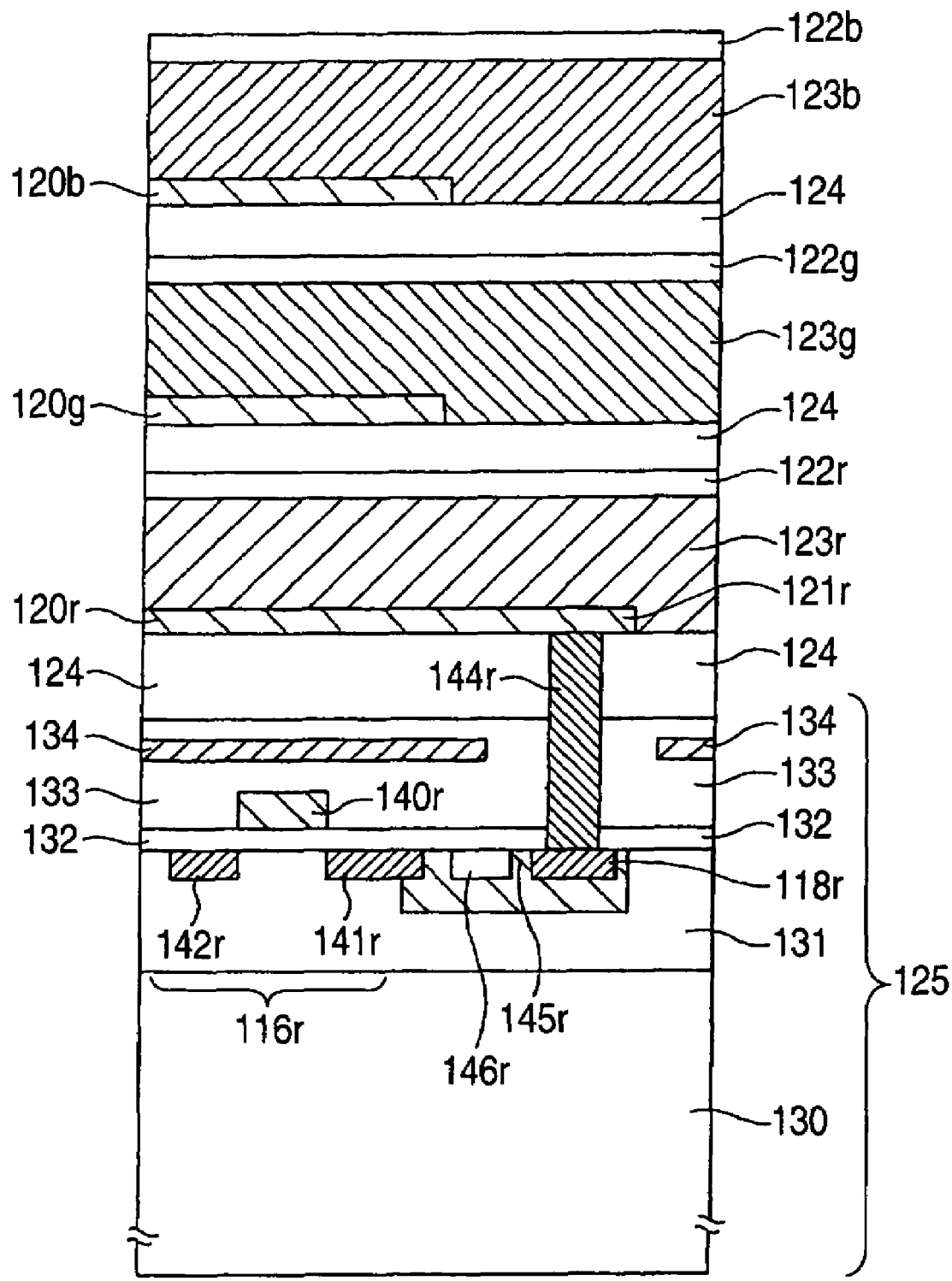
FIG. 5 is a typical sectional view taken along the line V-V in FIG. 2.

FIG. 5 is a typical sectional view taken along the line V-V in FIG. 2. That is, FIG. 5 is a view including a section of a portion stacked in the semiconductor substrate 125 shown in FIG. 3. AP-well layer 131 is formed on a surface portion of an n-type semiconductor substrate 130. In the embodiment, as shown in FIG. 5, the source 141r and drain 142r of the reset transistor 116r described in FIG. 4 are formed as n+ layers in the P-well layer 131.

As shown in FIG. 4, the source 141r of the reset transistor 116r is connected to the gate of the output transistor 114r. A signal in accordance with the amount of signal charges accumulated in a range from the source 141r of the reset transistor 116r to the gate of the output transistor 114r is read out by the output transistor 114r.

The connection portion 118r constituted by a high-density impurity region (n+ layer) connected to the red pixel electrode film 120r by a columnar wiring electrode 144r is provided in the surface portion of the P-well layer 131 of the semiconductor substrate 130. An n-type semiconductor region 145r for connecting the connection portion 118r and the source 141r of the reset transistor 116r to each other is provided in the surface portion of the P-well layer 131 of the semiconductor substrate 130. A high-density p-type impurity (p+) region 146r (i.e., impurity portion) is provided on the surface side of the n-type semiconductor region 145r and near the connection portion 118r (i.e., between the connection portion 118r and the source 141r).

In this embodiment, the n-type semiconductor region 145r serves as a charge path between the connection portion 118r and the source 141r while the high-density p-type impurity region 146r functions as the potential barrier unit 117r described in FIG. 4.

A gate insulator film 132 is formed on the surface of the P-well layer 131. A gate electrode 140r of the reset transistor 116r is provided on the gate insulator film 132. The columnar wiring electrode 144r piercing the gate insulator film 132 and extending to the connection portion 121r of the red pixel electrode film 120r shown in FIG. 2 is formed on the connection portion 118r.

An insulator film 133 is stacked on the gate insulator film 132. A light shielding film 134 is buried in the insulator film 133. The lowest insulator film 124 shown in FIG. 3 is stacked on the insulator film 133. The semiconductor substrate 125 shown in FIG. 3 is equivalent to a region ranging from the n-type semiconductor substrate 130 to the insulator film 133 in FIG. 5.

The wiring electrode 144r connected to the red pixel electrode film 120r is shown in FIG. 5 because FIG. 5 is a typical sectional view taken along the line V-V in FIG. 2. A wiring electrode extending to the green pixel electrode film 120g and a wiring electrode extending to the blue pixel electrode film 120b are provided so as to be erected in front and the rear of the illustrated wiring electrode 144r in a plane of FIG. 5. The arrangement positions and structures of the connection portion 118r, the n-type semiconductor region 145r, the high-density p-type impurity region 146r and the MOS transistor 116r around the red (R) wiring electrode 144r can be applied to those around the other color wiring electrodes.

Figure 6A:
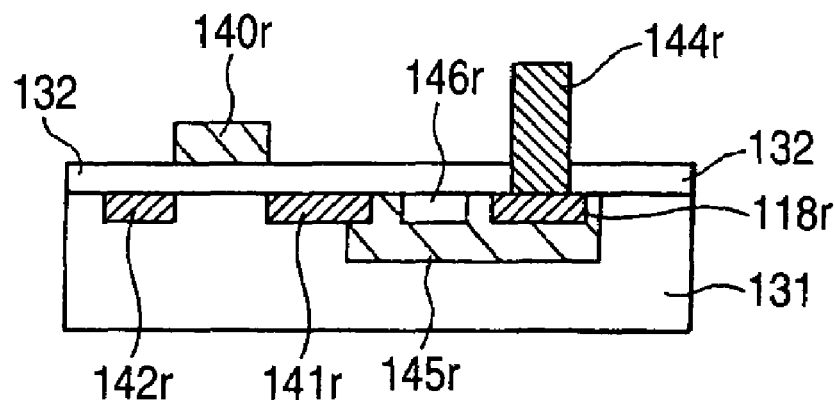
FIGS. 6A and 6B are views for explaining transfer of charges in the solid-state imaging device according to the first embodiment of the invention.
Figure 6B:
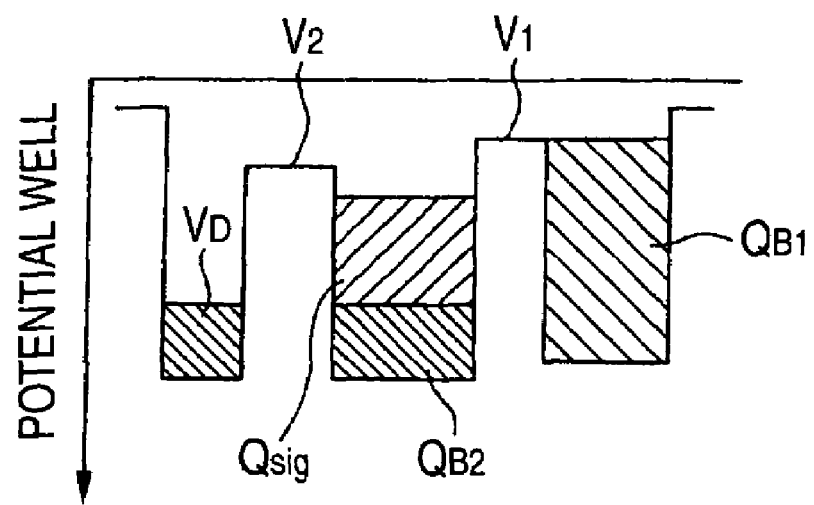

FIGS. 6A and 6B are views for explaining transfer of charges in the structure shown in FIG. 5. FIG. 6A is a view of the structure of main part extracted from FIG. 5. FIG. 6B shows a state of a potential well in the structure of FIG. 6A.

In this embodiment, because the high-density p-type impurity region 146r serving as a potential barrier region is provided between the columnar electrode 144r and the gate of the output transistor 114r (that is, the source 141r of the reset transistor 116r), signal charges Qsig passing through the columnar electrode 144r from the red pixel electrode film 120r and flowing into the connection portion 118r are not retained between the potential barrier region 146r and the pixel electrode film 120r but rapidly flow into a potential well formed under the source 141r (the gate of the output transistor) and are accumulated in the potential well.

Because the structure in which the potential barrier region 146r is provided between the gate of the output transistor and the electrode 144r to prevent signal charges from being accumulated in between the pixel electrode film 120r and the potential barrier region 146r is used as described above, that is, because the structure in which effective capacitance of the signal charge-storage portion becomes low compared with the gate of the output transistor is used, a signal voltage becomes high relative to the signal charges so that high sensitivity can be achieved.

Charges QB1 and QB2 shown in FIG. 6B are based on free electrons present in the connection portion 118r and the source 141r. There is however no problem because the charges QB1 and QB2 have no influence on the amount of signal charges as long as the amount of the free electrons accumulated in the well is always constant.

SECOND EMBODIMENT

Figure 7:
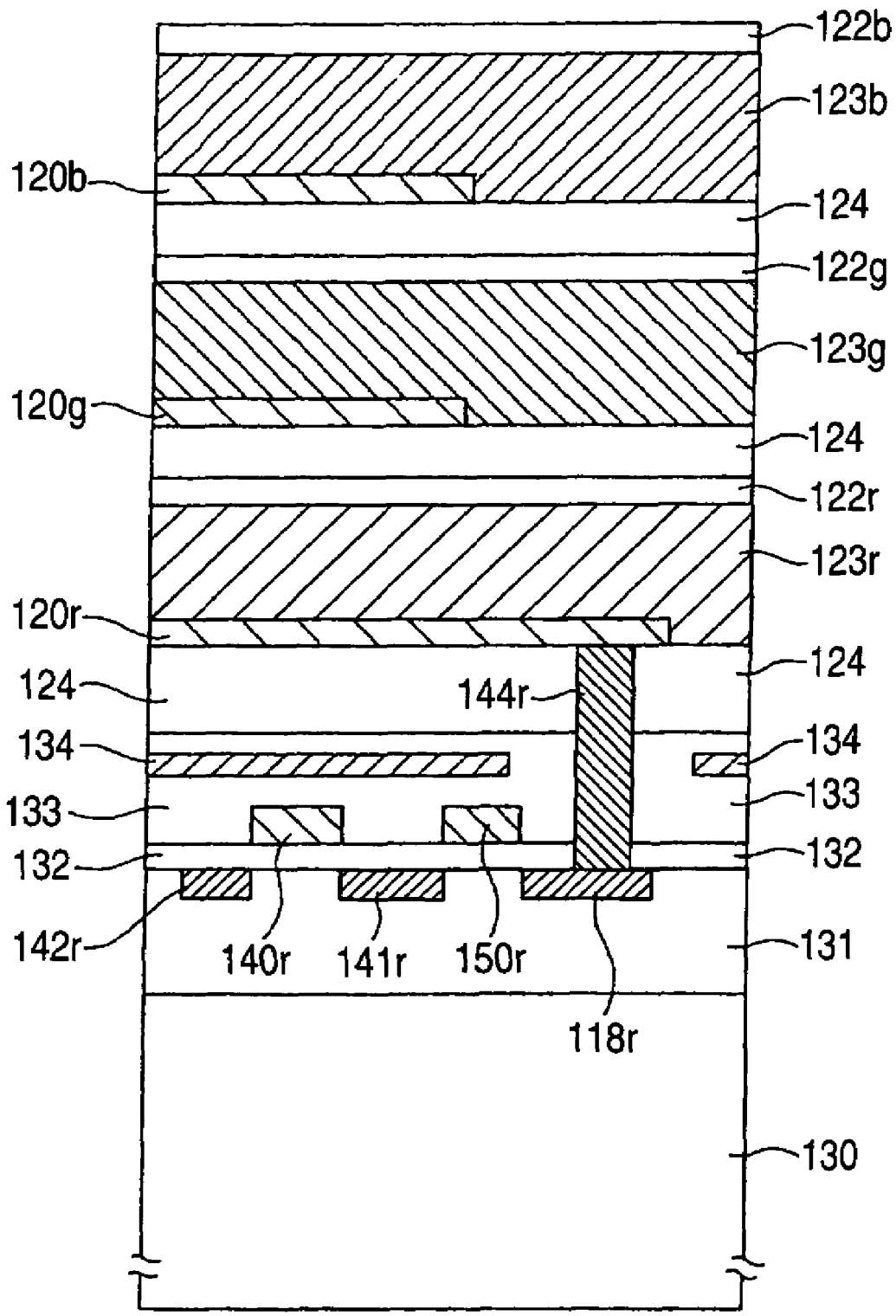
FIG. 7 is a typical sectional view of main part of a solid-state imaging device according to a second embodiment of the invention.

FIG. 7 is a typical sectional view of main part of a photoelectric conversion film lamination type solid-state imaging device according to a second embodiment of the invention. The embodiment shown in FIG. 5 is configured so that the high-density p-type impurity region 146r provided in the n-type semiconductor region 145r serving as a charge path is used as a potential barrier unit, and that the level (height) of the potential barrier is controlled by the thickness and density of the p-type impurity region 146r and the thickness of the n-type semiconductor region 145r under the p-type impurity region 146r. On the other hand, this embodiment is configured so that an electrode 150r is provided on an insulator film 132 serving as a gate insulator and between the connection portion 118r and the source 141r which serve as charge paths.

That is, this embodiment is configured so that the connection portion 118r, the source 141r and the electrode 150r constitute a potential barrier transistor, and that a supply voltage or ground potential is applied to the gate electrode 150r.

Even in the potential barrier unit configured as described above, signal charges Qsig passing through the columnar electrode 144r from the pixel electrode film 120r and flowing into the connection portion 118r are not retained between the electrode 150r and the pixel electrode film 120r but rapidly flow into a potential well formed under the source 141r (the gate of the output transistor) and are accumulated in the potential well in the same manner as in the first embodiment.

According the aforementioned embodiments, the following effect can be obtained because the structure in which a potential barrier region is provided between each color pixel and the gate of a corresponding output transistor to prevent signal charges from being accumulated in between the color pixel and the potential barrier region is used, that is, because the structure in which signal charges are accumulated in the gate portion is used. That is, effective capacitance of the signal charge-storage portion becomes low compared with the gate of the output transistor and a signal voltage becomes high relative to the signal charges, so that an output signal with high sensitivity can be obtained.

Moreover, because the voltage of the pixel electrode film is approximately fixed in the potential well of the potential barrier region, the electric field distribution between the common electrode film and the pixel electrode film is approximately constant in a photoelectric conversion period (the electric field does not change in the condition that the signal charges are accumulated) so that a linear photoelectric conversion film characteristic can be obtained as an accompanying effect.

Moreover, because the potential difference between adjacent parts of the pixel electrode film is always small, there is another effect that noise caused by a leak current, etc. based on an edge effect of the pixel electrode film can be reduced.

Although the aforementioned embodiments have been described on the case where each signal readout circuit has such a circuitry that a power supply line, a row selection transistor, an output transistor and a column signal line are connected successively, the invention may be applied to the case where the signal read out circuit has such a circuitry that a power supply line, an output transistor, a row selection transistor and a column signal line are connected successively.

Although the aforementioned embodiments have been described on the case where the photoelectric conversion films are provided as three layers so that incident light is detected while the color of the incident light is separated into the three primary colors of R, G and B, the invention may be applied to the case where a fourth photoelectric conversion film is additionally provided for detecting an intermediate color between green and blue besides R, G and B so that incident light is detected while the color of the incident light is separated into four colors. In this case, color reproducibility can be improved because color separation can be made more finely. In this case, three transistors each color, that is, twelve transistors in total are required but there is no problem because it is unnecessary to provide any photo acceptance portion on a semiconductor substrate unlike the CMOS type image sensor according to the related art so that it is possible to provide a large number of transistors on a semiconductor substrate.

Although the aforementioned embodiments have been described on the case where the photoelectric conversion films for detecting blue, green and red incident light components are provided in increasing order of wavelength viewed from above the solid-state imaging device, the arrangement sequence of the photoelectric conversion films is not limited thereto. Although a common electrode film and a corresponding pixel electrode film are provided so that each photoelectric conversion film is sandwiched between the common electrode film and the corresponding pixel electrode film, the common electrode film need not be provided on the upper side of the photoelectric conversion film, that is, the common electrode film may be provided on the lower side of the photoelectric conversion film.

Although each of all the pixel electrode films and common electrode films is made of a transparent or low-light-absorption material, only the electrode film nearest to the semiconductor substrate may be made of an opaque material.

Although the description of the aforementioned embodiments have not touched on the subject about an electronic shutter, it is a matter of course that the same electronic shutter function as that of a general CMOS type image sensor may be given to the invention.

The photoelectric conversion film-stacked type solid-state imaging device according to the invention has an advantage that the device can be used in place of a CCD type or CMOS type image sensor used heretofore, and that signals of the three colors of red, green and blue can be obtained from one pixel without use of any color filter. Accordingly, the photoelectric conversion film-stacked type solid-state imaging device according to the invention is useful when mounted in a digital camera, etc.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The present application claims foreign priority based on Japanese Patent Application No. JP2004-77694, filed Mar. 18, 2004, the contents of which is incorporated herein by reference.

What is claimed is:

1. A solid-state imaging device comprising:
   a semiconductor substrate having a signal readout circuit, wherein the signal readout circuit is an MOS transistor circuit, and the signal readout circuit comprises an output transistor;
   a photoelectric conversion film that generates a signal charge in accordance with an intensity of an incident light;
   a wiring that leads the signal charge to the semiconductor substrate;
   a connection portion that connects the wiring to the semiconductor substrate;
   a charge path that connects the connection portion to a gate portion of the output transistor; and
   a potential barrier unit provided in the charge path and near the connection portion, wherein the potential barrier unit serves as a potential barrier against a charge of the connection portion so that the signal charge flowing into the connection portion flows into the gate portion of the output transistor while the signal charge is not retained between the potential barrier and the photoelectric conversion film.

2. The solid-state imaging device according to claim 1, wherein the signal readout circuit further comprises: a row selection transistor; and a reset transistor.

3. The solid-state imaging device according to claim 1, wherein the potential barrier unit comprises an impurity portion in the charge path, the impurity portion having a conductivity type opposite to that of the charge path, the connection portion and the gate portion.

4. The solid-state imaging device according to claim 1, wherein the potential barrier unit comprises: a source; a drain; and a gate electrode on a gate insulator and between the source and the drain,
   wherein the source is the connection unit, and the drain is the gate portion of the output transistor.

5. The solid-state imaging device according to claim 1, which comprises a plurality of photo acceptance portions arranged in a planar array on a surface portion of the solid-state imaging device,
   the solid-state imaging device comprising a plurality of sets of layered products, wherein the sets of the layered products are stacked in a direction perpendicular to a surface of the semiconductor substrate, each of the layered products comprising:
   a common electrode film to pixels;
   a plurality of pixel electrode films arranged in the planar array, each of the pixel electrode films being partitioned in accordance with one of the pixels; and
   the photoelectric conversion film between the common electrode film and the pixel electrode films arranged in the planar array, wherein
the photoelectric conversion film of each of the layered products detects the incident light differing in wavelength between the layered products,
the pixel electrode films in each position of the planar array are arranged in a line with respect to an incidence direction of the incident light, and
the pixel electrode films in each position of the planar array form one partition unit of the photo acceptance portions.

6. The solid-state imaging device according to claim 5, wherein the layered products includes as the photoelectric conversion film:
a first photoelectric conversion film having a peak of spectral sensitivity characteristic at red;
a second photoelectric conversion film having a peak of spectral sensitivity characteristic at green; and
a third photoelectric conversion film having a peak of spectral sensitivity characteristic at blue.

7. The solid-state imaging device according to claim 6, wherein the signal readout circuit reads out signals of colors of red, green and blue, each signal being detected by the photo acceptance portions, and
the semiconductor substrate has the signal readout circuit under the photo acceptance portions.

8. The solid-state imaging device according to claim 1, wherein the semiconductor substrate has an image signal output portion that accepts an analog signal and outputs the analog signal, the analog signal being read out by the signal readout circuit from the photo acceptance portions.

9. The solid-state imaging device according to claim 1, wherein the image signal output portion comprises an analog-to-digital conversion portion that converts the analog signal into a digital signal and outputs the digital signal.

* * * * *